United States Patent
Paquet et al.

(10) Patent No.: US 6,896,613 B2
(45) Date of Patent: May 24, 2005

(54) METHOD OF STARTING MACHINERY

(75) Inventors: Bert J. F. Paquet, Sint Andries (BE); Geert R. J. Vergote, Izegem (BE); Dries M. J. Depreitere, Koekelare (BE); Ward M. R. Byttebier, Zwevegem (BE); Bart Busschaert, Poperinge (BE)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/412,005

(22) Filed: Apr. 11, 2003

(65) Prior Publication Data

US 2004/0025610 A1 Feb. 12, 2004

(30) Foreign Application Priority Data

Apr. 25, 2002 (GB) .............................. 0209430

(51) Int. Cl.[7] .............................................. A01D 75/00
(52) U.S. Cl. .............................. 460/6; 460/60

(58) Field of Search ................................ 460/6, 60, 59, 460/119; 56/10.36; 192/3.51, 3.57, 3.58

(56) References Cited

U.S. PATENT DOCUMENTS

| | | | | | |
|---|---|---|---|---|---|
| 3,093,946 | A | * | 6/1963 | Pitt et al. | 460/6 |
| 4,343,387 | A | * | 8/1982 | Hofbauer | 477/89 |
| 4,760,902 | A | * | 8/1988 | Bellanger | 477/172 |
| 5,873,227 | A | * | 2/1999 | Arner | 56/14.6 |
| 6,213,870 | B1 | * | 4/2001 | Satzler | 460/6 |

* cited by examiner

*Primary Examiner*—Meredith C. Petravick
(74) *Attorney, Agent, or Firm*—Rebecca Henkel; Brant T. Maurer

(57) ABSTRACT

A method is disclosed for starting heavy machinery driven by an internal combustion engine. The method comprises starting the engine and cyclically operating a clutch to couple the engine to the machinery intermittently. The transmission of torque to the machinery through the clutch is briefly interrupted or reduced when the engine risks stalling.

20 Claims, 3 Drawing Sheets

METHOD OF STARTING MACHINERY

FIELD OF INVENTION

The present invention relates to the starting of heavy machinery and is applicable in particular to the coupling of the engine of a combine harvester to the thresher unit by means of a clutch.

BACKGROUND OF THE INVENTION

The torque required to initiate the operation of subsystems of heavy machinery such as the thresher unit of a combine harvester is greater than that required to operate it after it has been started. Indeed, it is possible to operate a combine harvester and maintain the thresher unit in operation using an engine that does not have sufficient torque to start the thresher unit from a standstill. This problem has become more prominent with the introduction of larger, high-capacity combine harvesters.

To provide an engine of sufficient power to be able to produce the full output torque needed to start the thresher unit would be wasteful both in terms of the initial cost of the engine and its running cost. It is clearly more efficient to design and dimension the engine only to be able to maintain all the subsystems of the harvester operating once it has been started.

SUMMARY OF INVENTION

When the engine is so dimensioned, the present invention seeks to provide a solution to the problem of starting the heavy machinery given that simply coupling it to the engine would result in the engine stalling on account of its maximum output torque being exceeded.

In accordance with the invention in its broadest aspect, there is provided a method of starting heavy machinery driven by a power source, which comprises starting the power source and cyclically operating a clutch to couple the power source to the machinery intermittently, the transmission of torque to the machinery through the clutch being briefly interrupted or reduced automatically when the power source risks stalling.

The invention in its broadest aspect allows the heavy machinery to be started without resorting to an auxiliary source of torque or the use of a gearbox, either of which would add considerably to the manufacturing cost. Instead, the invention takes advantage of the fact that if the power source is coupled to the machinery while the power source is running with full output torque, it will succeed in making a small impression on the speed of the machinery before its own speed is reduced by the reaction torque from the machinery to the point where it risks stalling. If at this point torque transmission through the clutch is reduced or interrupted, then the machinery, because of its inertia, will continue to rotate while the power source speed recovers. The effect of this one cycle of clutch engagement and disengagement is therefore to increment the speed of rotation of the machinery. By repeating several times the cycle of clutch operation, the speed of rotation of the heavy machinery will be built up incrementally until the machinery eventually reaches the speed when it can safely be driven by the power source without any risk of the power source stalling.

It would be possible for the cyclic operation of the clutch to be carried out in a predetermined manner, the engagement durations as well as the number of engagements being selected to allow for a worst case scenario. In other words, the engagement periods can be selected to be so short that the engine would never risk stalling and the disengagement periods so long that the engine will always recover from a near-stalling condition. In addition, this cyclic operation, consisting of intermittent engagement and disengagement of the clutch, could be repeated a predetermined number of times in order to ensure that the speed of rotation of the heavy machinery will be built up incrementally to a speed equalling or exceeding the speed required for permanently coupling the engine to the machinery without any risk of the engine stalling.

However, because of the large number of variables that affect engine performance and the reaction torque from the heavy machinery, such open loop control would result under most conditions in much slower starting than necessary and it is for this reason preferred to employ closed loop control of the clutch, clutch disengagement being initiated in response to a sensed engine parameter indicative of imminent stalling.

Various parameters (for example output torque) can be used to indicate imminent stalling of the engine but it is advantageous to rely on a parameter that is sensed by a sensor that is normally present in the engine. Hence in the preferred embodiment of the invention imminent stalling of the engine is derived by analysing the output of an engine speed sensor. While a drop in engine speed may itself provide an indication that the engine is about to stall, it is advantageous to rely on the rate of change of engine speed as this provides an earlier indication and enables the engine to recover reliably when the clutch is disengaged.

Torque transmission through the clutch is preferably controlled continuously, the clutch pressure being ramped up to increase torque transmission and ramped down to decrease torque transmission to the machinery. To this end, it is advantageous for the clutch to be operated by a hydraulic pressure that can be continuously varied.

According to a second aspect of the present invention, there is provided an agricultural machine having a power source, heavy machinery driven by the power source, a clutch for coupling the machinery to the power source and a controller for controlling the transmission of torque through the clutch, wherein during starting of the heavy machinery from standstill, the controller acts on the clutch to reduce or interrupt briefly the transmission of torque from the power source to the heavy machinery when the power source risks stalling.

BRIEF DESCRIPTION OF THE DRAWINGS

The invention will now be described further, by way of example, with reference to the accompanying drawings, in which.

DETAILED DESCRIPTION OF THE PREFERRED EMBODIEMENT

Figure 1:
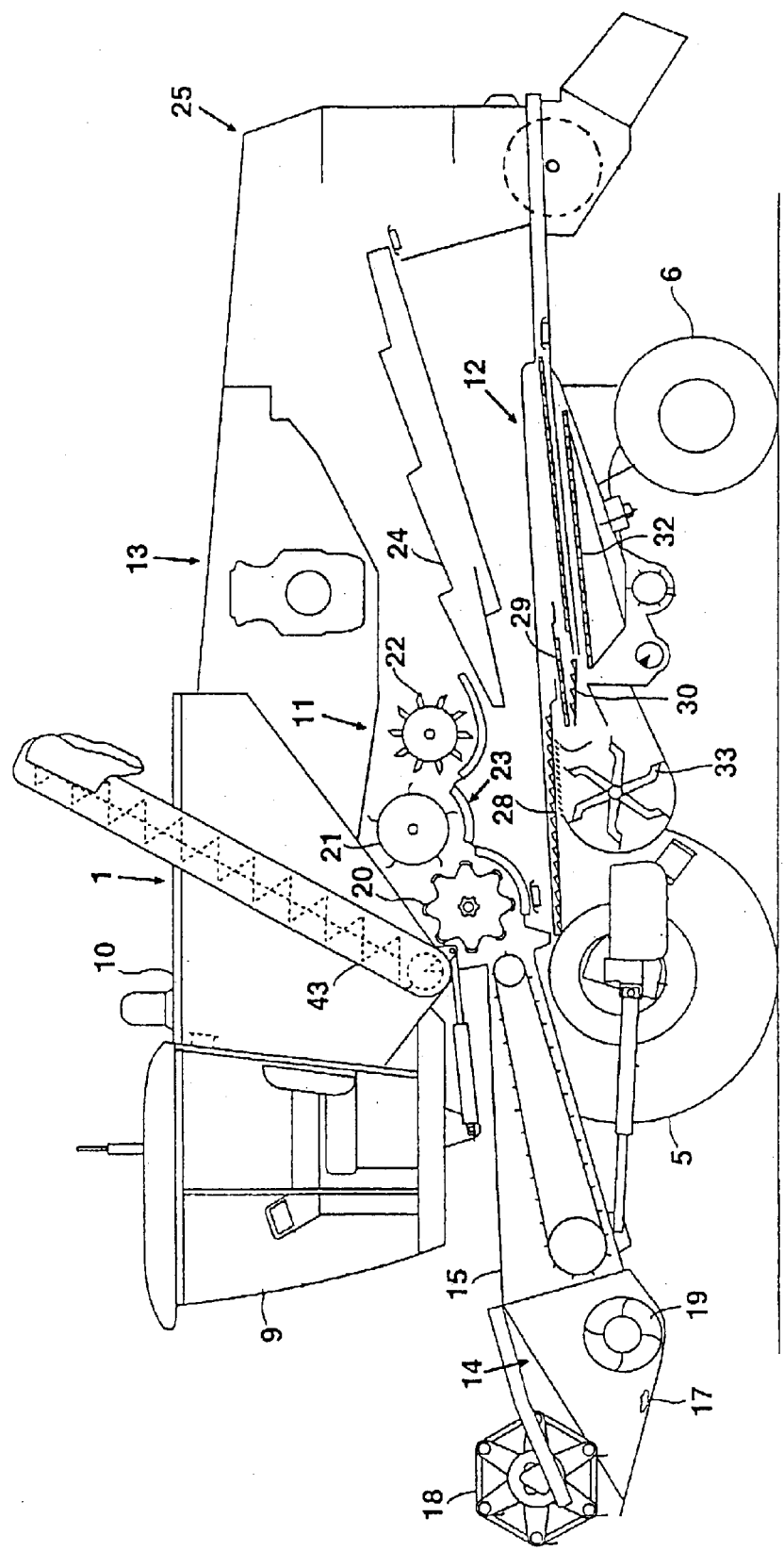
FIG. 1 is a schematic side view of a combine harvester.

While the invention can be applied to various agricultural vehicles, it will be described herein by reference to a combine harvester. To understand the background of the invention, such a combine will first be described briefly though its construction and operation are well known in the art.

The illustrated self-propelled combine 1 has large front drive wheels 5 and smaller steerable rear wheels 6. Power for travelling and for driving the crop processing subsystems is provided by an engine 13 on top of the combine 1. The combine 1 is provided with a header 14, which is detachably mounted to the housing of a straw elevator 15. This housing can be moved up and down about a transverse axis below and behind the combine cab 9.

For harvesting operations, the straw elevator 15 is moved downwardly until the transverse sickle bar 17 floats slightly above ground level. The crop stems are cut loose from their roots by the transverse sickle bar 17 as the machine travels over the field. Meanwhile a transverse header reel 18 is rotated to guide the cut stems to the rear of the header and within reach of a transverse auger 19. The straw elevator 15 grabs material delivered by the auger 19 to the mouth of the elevator housing and conveys it upwardly and rearwardly to the threshing mechanism 11. The material is impacted by a threshing drum 20 which co-operates with a concave 23 to loosen the grain kernels from the ears. Most of the grain kernels are beaten out of the ears by this first drum 20. In order to prevent further rotation of the material by and around the threshing drum 20, the material is taken off from the drum by the flights of the beater drum 21.

A further concave is installed below the drum for allowing loosened grain kernels to fall to the cleaning mechanism 12 below. The beater drum 21 delivers the mixture of crop material rearwardly to the rotary separator 22. Also the rotary separator 22 has a concave below, permitting further deposit of grain on the cleaning mechanism 12. The material from the rotary separator is deposited onto the front end of the straw walkers 24. The straw walkers move the threshed crop material to the rear 25 of the combine, from where it is allowed to fall onto the field.

The bulk material that comes from the threshing mechanism, is deposited onto the grain pan 28. The even layer of crop material falls from the grain pan 28 onto a pre-cleaning sieve 29. During its fall from the grain pan on the sieve 29 the material is engaged by an air flow from the fan 33 such that the lighter particles are blown rearwardly. The material which reaches the end of the pre-cleaning sieve 29 falls to the front end of the upper sieve.

The material that falls through the pre-cleaning sieve 29 (mostly grain kernels), is received on a small grain pan 30 which guides it to the lower sieve 32. The cleaned grain is then transported to the grain tank 10. When the grain tank is full, it can be emptied by means of an unloading tube 43 which can be swung out with its end above a wagon which travels next to the combine.

The threshing drum 20 and its concave 23 are usually referred to as the threshing mechanism, i.e. the device performing the most vigorous action on the crop material. The rotary separator 22 and the straw walkers 24 constitute the separating mechanism, i.e. the device effecting the separation of the threshed grain kernels from the straw. These threshing and separating mechanisms together with the cleaning mechanism 12 form the crop processing elements, collectively indicated as the thresher unit 11. They are set in motion together with the cleaning mechanism 12 at the same time since they are driven from the engine 13 by the same drive train. This ensures operation of all thresher unit elements by a single operator control, which is to be preferred above the separate engagement of distinct elements of the thresher unit 11, as this could lead to an oversight on the part of the operator to engage all the elements of the complete thresher unit 11. This could also lead to a severe blockage of crop material internally in the thresher unit 11. Moreover, a single drive train from the complete threshing unit has additional advantages such as a reduction in manufacturing costs and assembly time.

As described above, the thresher unit 11 comprises many large components and their moments of inertia are considerable. Because of this, the engine 13 that a.o. drives the thresher unit 11 does not have the torque to start the thresher unit 11 though it can keep it running once it has started. This apparent contradiction can readily be explained by considering a garden roller which requires great effort to start and to stop, because of its high moment of inertia, but requires relatively little effort to keep it rolling on flat ground.

Figure 2:
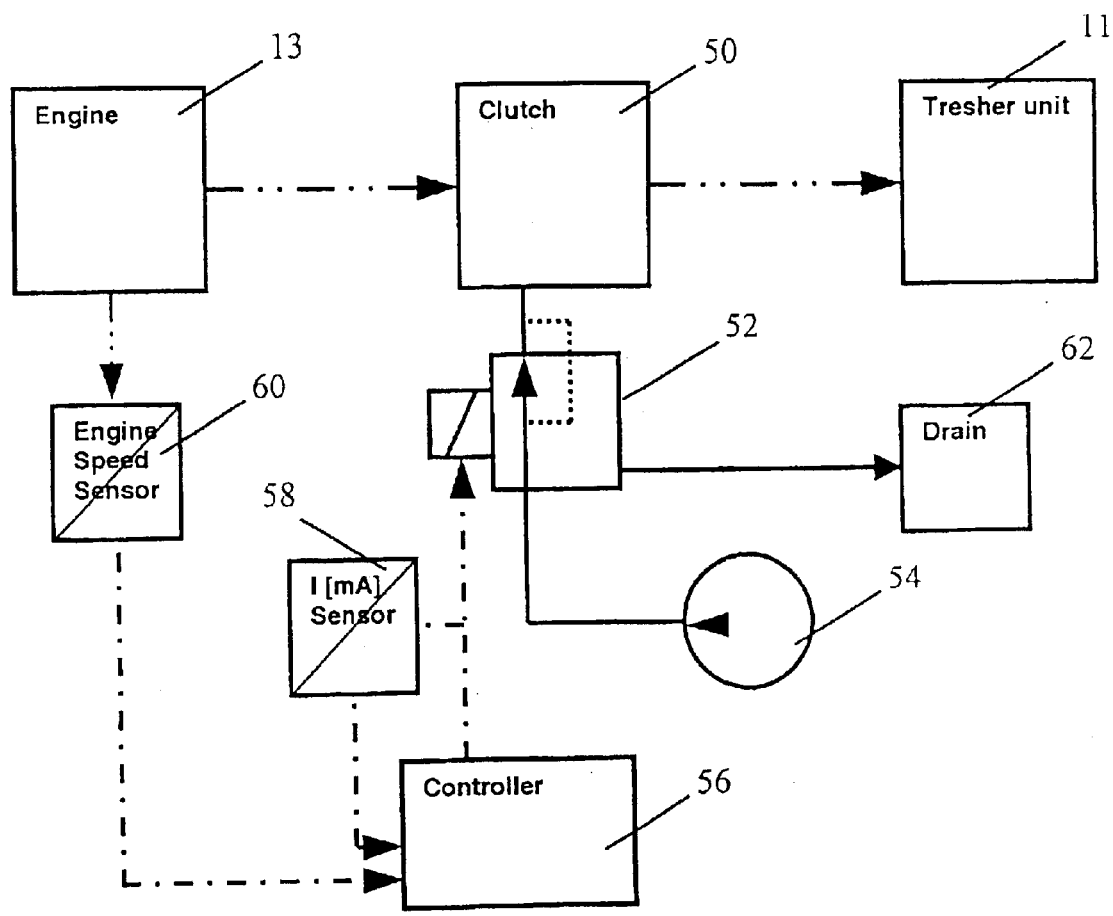
FIG. 2 is a block diagram of a control system embodying the invention.

FIG. 2 shows a control system that allows the engine to start the thresher unit 11. In FIG. 2, the engine 13 is connected to the thresher unit 11 through a hydraulically operated clutch 50. Hydraulic fluid is supplied to the clutch 50 from an oil pump 54, the pressure being regulated by a regulator 52 that is also connected to a drain 62. An electronic controller 56 receives signals from a speed sensor 60 associated with the engine 13 and from a current sensor 58 associated with the clutch pressure regulator 52. The electronic controller 56 is programmed to set the clutch pressure regulator 52 in accordance with a control algorithm as described below.

The regulator 52 acts to apply to the clutch 50 the desired pressure commanded by the controller 56. To this end, the regulator 52 may take the form of a pressure control valve with a solenoid connected to the controller 56. The fluid pressure after the valve is proportional to the solenoid current. To guarantee a proper valve setting, the solenoid current is monitored by the current sensor 58 which informs the controller 56 of the actual electrical current.

As an alternative, the regulator may include a pulse width modulated valve that alternately connects the clutch 50 to the oil pump 54 and to the drain 62. The mark-to-space ratio of the signal applied to the valve is varied by a closed feedback loop within which the actual pressure in the clutch 50 is compared with the desired pressure commanded by the controller 56. Thus, when the actual pressure in the clutch 50 is less than the desired pressure commanded by the controller 56, the proportion of the time during which the clutch 50 is connected to the oil pump 54 is increased. Conversely, when the clutch pressure is greater than the desired pressure, the closed loop increases the proportion of the time that the clutch 50 is connected to the drain 62.

At the commencement of operation of the combine harvester, the engine 13 must first be started, then the thresher unit 11 must be set in motion and finally the header 14 can be engaged and wheels 5 driven to commence harvesting. The invention is concerned with the step of starting the thresher unit 11 after the engine 13 has been started and set to produce its maximum output torque.

Figure 3:
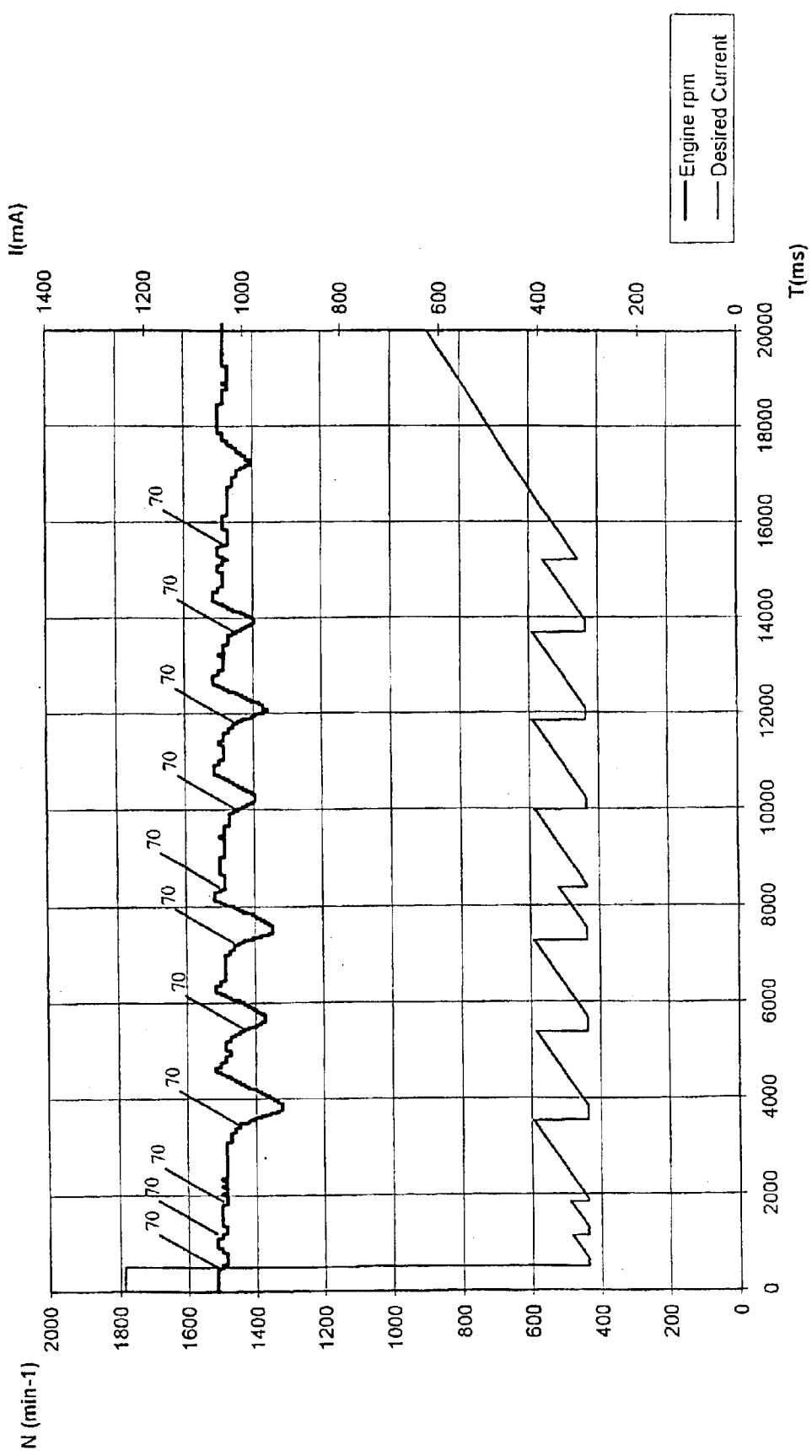
FIG. 3 is a graph representing cyclic engagement and disengagement of a clutch and the consequent engine speed variations.

As earlier explained, even with the engine 13 operating with maximum power output, engaging the clutch 50 and keeping it engaged would result in the engine stalling. To avoid this, the controller 56 starts by commanding the regulator 52 to apply a high hydraulic pressure to cause the clutch 50 to engage as shown in FIG. 3. While the clutch 50 is engaged, the controller 56 analyses the output of the speed sensor 60 and detects in particular when the rate of reduction of the engine speed exceeds a given threshold. A rapid drop 70 in engine speed is used as an indication that the engine 13 is on the point of stalling. With stalling imminent but before it occurs, the controller 56 commands the regulator 52 to reduce the torque transmission through the clutch 50 by reducing the oil pressure. As the load is taken off the engine 13, a stall is averted and the engine speed once again builds up.

Even though the driving torque applied to the thresher unit 11 is interrupted or at least reduced, the thresher unit 11 continues to turn by virtue of its large inertia. After the engine 13 has recovered from the near-stalling condition, the clutch 50 is once again engaged and kept engaged until once again the engine 13 risks stalling. As can be seen in FIG. 3, this process is repeated as many times as necessary, each time increasing the speed of the thresher unit 11 by an increment. After typically fifteen seconds of such cyclic engagement of the clutch 50 in the arrangement as described (a shorter or a longer time could be possible depending on external factors e.g. the size of the machine, temperature, wear, . . . ), the thresher unit 11 reaches a speed when permanent engagement of the clutch 50 no longer causes the engine 13 to risk stalling. The clutch pressure is then increased up to its maximum and maintained there throughout the time that the thresher unit 11 is in operation.

It can be seen that by cyclically increasing and reducing the clutch pressure, the invention allows the thresher unit 11 to be started even though the required starting torque for the thresher unit 11 would normally be sufficient to stall the engine 13.

It will be clear that various modifications can be made to the described control system without departing from the scope of the invention as set out in the appended claims. For example, different parameters can be used to initiate disengagement and re-engagement of the clutch. Furthermore, the clutch can be operated in an on/off manner instead of the described continuous control of the clutch engagement pressure.

It will be understood that changes in the details, materials, steps and arrangements of parts that have been described and illustrated to explain the nature of the invention will occur to and may be made by those skilled in the art upon reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A method of starting heavy machinery driven by a power source, which comprises the steps of: starting the power source;
   operating a clutch cyclically to couple the power source to the machinery intermittently; and
   reducing the transmission of torque to the machinery through the clutch automatically when the power source risks stalling,
   comparing a measured fluid pressure applied to engage the clutch with a desired pressure commanded by the controller.

2. A method as claimed in claim 1, in which the power source is an internal combustion engine.

3. A method as claimed in claim 2, which comprises monitoring an engine parameter indicative of imminent stalling of the engine and initiating a reduction or an interruption of the transmission of torque to the machinery through the clutch in response to the monitored parameter exceeding a predetermined value.

4. A method as claimed in claim 3, wherein the monitored parameter is the rate of change of the engine speed.

5. A method as claimed in 1, wherein the transmission of torque through the clutch is increased and reduced in a continuous manner.

6. A method as claimed in 2, wherein the transmission of torque through the clutch is increased and reduced in a continuous manner.

7. A method as claimed in 3, wherein the transmission of torque through the clutch is increased and reduced in a continuous manner.

8. A method as claimed in 4, wherein the transmission of torque through the clutch is increased and reduced in a continuous manner.

9. The method as recited in claim 1, further including the step of:
   increasing a proportion of time that the clutch is connected to a drain when the measured fluid pressure to the engage the clutch exceeds the desired pressure commanded by the controller.

10. An agricultural vehicle, comprising:
    a power source;
    a machinery driven by the power source;
    a clutch for coupling the machinery to the power source; and
    a control system for controlling the transmission of torque through the clutch drive the machinery, wherein the control system includes a controller configured to act on the clutch to reduce or interrupt briefly the transmission of torque from the power source to the heavy machinery when the power source risks stalling, and a closed feedback loop configured for comparison of a measured fluid pressure applied to engage the clutch with a desired pressure commanded by the controller.

11. The agricultural vehicle as recited in claim 10, wherein the controller is configured to increase a proportion of time that the clutch is connected to a drain when the measured fluid pressure to engage the clutch exceeds the desired pressure commanded by the controller.

12. An agricultural vehicle as claimed in claim 10, in which the power source is an internal combustion engine.

13. An agricultural vehicle as claimed in claim 12, further comprising an engine speed sensor and wherein the controller is operative to initiate a reduction or interruption in the transmission of torque through the clutch in response to rate of reduction of the engine speed exceeding a predetermined threshold.

14. An agricultural vehicle as claimed in claim 10, wherein the clutch is hydraulically operated and a clutch pressure regulator is provided to set the clutch engagement pressure at a desired value determined by the controller.

15. An agricultural vehicle as claimed in claim 12, wherein the clutch is hydraulically operated and a clutch pressure regulator is provided to set the clutch engagement pressure at a desired value determined by the controller.

16. An agricultural vehicle as claimed in claim 13, wherein the clutch is hydraulically operated and a clutch pressure regulator is provided to set the clutch engagement pressure at a desired value determined by the controller.

17. An agricultural vehicle as claimed in claim 10, wherein the vehicle is a combine harvester and the heavy machinery is a thresher unit.

18. An agricultural vehicle as claimed in claim 12, wherein the vehicle is a combine harvester and the heavy machinery is a thresher unit.

19. An agricultural vehicle as claimed in claim 13, wherein the vehicle is a combine harvester and the heavy machinery is a thresher unit.

20. A control system for starting an agricultural vehicle, the agricultural vehicle including a power source, a machinery driven by the power source, and a clutch for coupling the machinery to the power source, the control system comprising:
- a controller for controlling the transmission of torque through the clutch to drive the machinery, wherein the controller is configured to act on the clutch to reduce or interrupt briefly the transmission of torque from the power source to the heavy machinery when the power source risks stalling, and
- a pressure regulator connected to regulate a desired pressure of hydraulic fluid to the clutch as commanded by the controller;
- a sensor configured to generate a signal representative of a measured electrical current communicated from the controller to the regulator, wherein the sensor communicates the signal to the controller.

* * * * *